Patented May 23, 1939

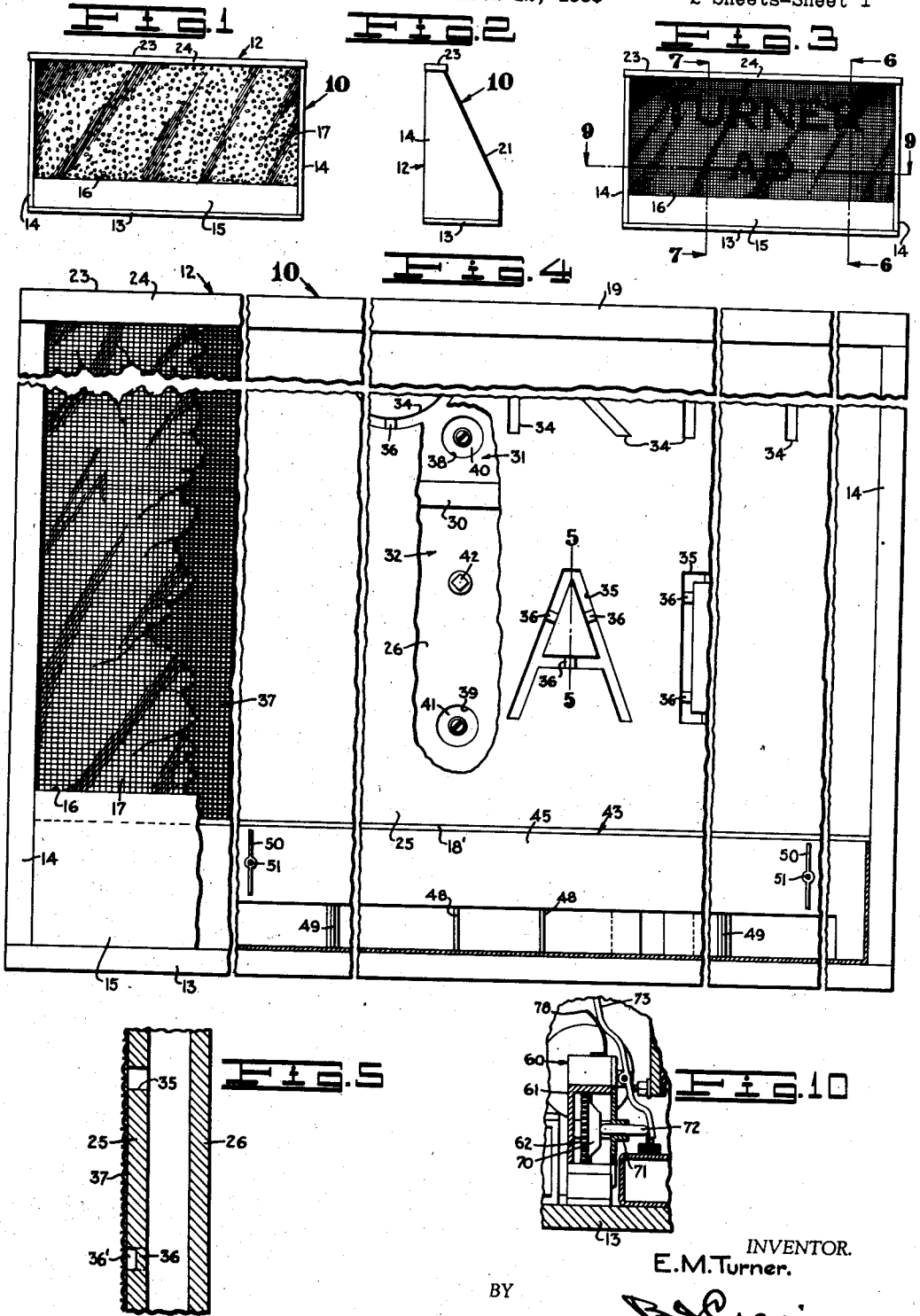

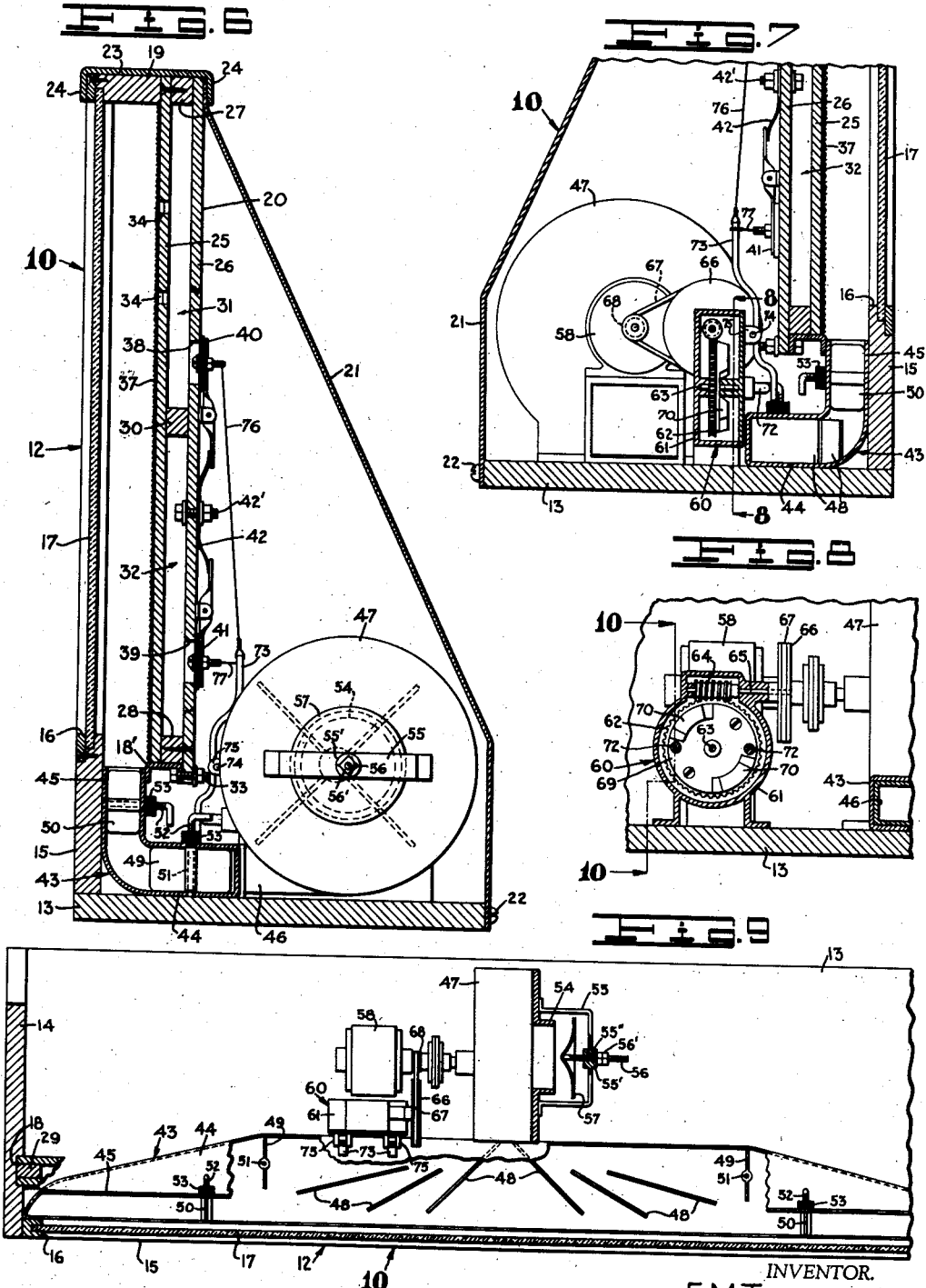

2,159,461

UNITED STATES PATENT OFFICE 2,159,461

DISPLAY DEVICE

Estey M. Turner, Arcadia, Calif.

Application March 12, 1938, Serial No. 195,589

4 Claims. (Cl. 40—37)

This invention relates to improvements in display devices.

The general object of this invention is to provide an improved animated display device.

Another object of the invention is to provide a display device wherein particles of material such as confetti are suspended in moving air and wherein novel means is provided for controlling the action of the confetti.

Other objects and the advantages of this invention will be apparent from the following description taken in connection with the accompanying drawings wherein:

Fig. 1 is a front view of my improved display device showing the confetti in motion;

Fig. 2 is an end view of the device shown in Fig. 1;

Fig. 3 is a view similar to Fig. 1 showing the confetti formed into letters;

Fig. 4 is an enlarged fragmentary front view of the device with portions broken away to show various details thereof;

Fig. 5 is a fragmentary enlarged section taken on line 5—5 of Fig. 4;

Fig. 6 is an enlarged section taken on line 6—6 of Fig. 3;

Fig. 7 is a fragmentary enlarged section taken on line 7—7 of Fig. 3;

Fig. 8 is a fragmentary section taken on line 8—8 of Fig. 7;

Fig. 9 is an enlarged fragmentary section taken on line 9—9 of Fig. 3 with portions broken away to more clearly show details of the device; and Fig. 10 is a fragmentary section taken on line 10—10 of Fig. 8.

Referring to the drawings by reference characters I have indicated my improved display device generally at 10. As shown the display device 10 includes a housing 12 which includes a bottom 13, spaced sides 14 and a front wall 15 having an aperture 16 therein which is closed by a glass panel 17. Spaced rearward from the front the side walls 14 each has a vertical groove 18 therein (see Fig. 9) which terminates a predetermined distance above the bottom 13. At the bottom of the grooves 18 a channel member 18' extends from one end wall 14 to the other and may be secured thereto in any desired manner. A top member 19 which is spaced between the grooves 18 and the glass panel 17 connects the end walls 14.

Positioned in the grooves 18 I provide a rectangular frame member which is indicated generally at 20. A metal back member 21 is provided which is shown as secured to the bottom 13 by screws 22 and at its upper end includes a flanged portion which engages the rear face of the frame member 20 as clearly shown in Fig. 6.

Over the upper end of the housing 12, the upper end of the frame 20 and the back 21 I provide a removable metal cover member 23 which includes downwardly extending side flanges 24 to grip the various portions on which the top is placed to retain them in assembled form.

As shown the frame member 20 includes a front member 25, a back member 26 spaced from the front, a top member 27, a bottom member 28 and end members 29. Within the frame 20 intermediate the top and bottom thereof I provide a partition 30 which forms an upper chamber 31 and a lower chamber 32 within the frame. As shown in Fig. 6 the back 26 of the frame 20 is removably secured to the channel 18' as by a nut and bolt 33.

Within the area of the upper chamber 31 the front member 25 has a plurality of indicia 34 cut therethrough in stencil form. Likewise within the area of the lower chamber 32 the front member 25 has a plurality of stencil like indicia 35 cut therethrough. The connecting portions 36 of the stencil like indicia 34 and 35 are all recessed from the front face of the front member 25 as clearly shown at 36 in Fig. 5.

The entire front face of the front member 25 is covered with a fine mesh screen 37 or other air pervious material. The rear member 26 of the frame has an aperture 38 therein which opens into the upper chamber 31 and an aperture 39 therein which opens into the lower chamber 32. The aperture 38 is normally closed by a flute valve 40 mounted on the back member 26 and the aperture 39 is normally closed by a flute valve 41 mounted on the back member. Both of the flute valves 40 and 41 are normally urged to closed positions by a leaf spring 42 held on the back member 26 by a bolt 42'.

Within the housing 12 I provide an air manifold which is indicated generally at 43. As shown the manifold 43 includes a horizontal portion 44 and a vertical portion 45 the upper end of which is open. Intermediate its length the manifold 43 communicates with the outlet 46 of a blower member 47. Within the horizontal portion 44 of the manifold I provide a plurality of deflector partitions 48 which are provided to evenly distribute the air flow in the manifold (see Fig. 9).

Within the horizontal portion 44 of the manifold I provide a plurality of adjustable vane members 49 and in the vertical portion 45 I provide a plurality of similar adjustable vane members 50. As shown each of the vane members is mounted on a spindle 51 which extends out of the manifold. The exposed portion of the spindle is threaded as indicated at 52 and has a nut 53 thereon which when tightened against the manifold locks the associated vane in an adjusted position. By turning the vanes 49 or 50 the air flow in the manifold may be diverted in a desired direction.

As shown in Fig. 9 the blower 47 includes a flanged intake port 54. Straddling the intake port 54 I provide a stirrup member 55 which includes a boss portion 55' having a threaded aperture 55'' therein. Positioned in the aperture 55'' I provide a threaded stem 56 having lock nuts 56' thereon. Mounted on the inner end of the stem 56 I provide a concave disk 57 the apex of which is directed towards the port 54. By moving the disk 57 away from or towards the port 54 the amount of air drawn into the blower may be regulated. The blower 47 is shown as driven by an electric motor 58.

For operating the flute valves 40 and 41 I provide an actuator indicated at 60. As shown the actuator 60 includes a housing 61 having a worm gear 62 rotatably mounted therein on a shaft 63. A worm 64 meshes with the gear 62 and is mounted on a shaft 65 which extends out of the housing 61 and has a pulley 66 thereon. The pulley 66 is driven by a belt 67 from a pulley 68 on the armature shaft of the motor 58. On one face of the worm gear 62 I provide a plate 69 having a pair of spaced extending cam portions 70 thereon. The housing 61 has a pair of opposed apertured bosses 71 thereon in each of which I provide a plunger 72. (See Fig. 10.)

The outer end of each plunger is adapted to engage the lower portion of a lever 73 which is pivoted intermediate its length as at 74 to brackets 75 on the housing. One of the levers 73 is connected by a wire 76 to the upper flute valve 40 and the other lever 73 is connected by a wire 77 to the lower flute valve 41. Mounted on the housing 61 I provide a pair of flat spring members 78 which resiliently urge the lower ends of the levers 73 into engagement with their associated plungers 72 and which in turn retain the plungers in engagement with the disk 69. Thus when the worm gear 62 and the disk 69 rotate the cam portions 70 will force the plungers 72 outward which in turn will rock the levers 73 about their axis 74 and the wires 76 and 77 will swing their associated flute valves out of engagement with the back member 26 of the frame 20 thereby allowing free passageway through the apertures 38 and 39.

After the cam portions pass the plungers the springs 78 return the levers 73 to their initial positions whereupon the flute valves 40 and 41 close. The cam disk 69 has the cam members 70 thereon arranged to open both the flute valves at the same time but the disk 69 may be replaced by other cam disks whereon the cam portions may be arranged to operate the flute valve alternately or in any sequence desired. Furthermore it will be understood that the frame member 20 may include any desired number of chambers similar to the chambers 31 and 32 with each chamber having a passageway thereinto controlled by a flute valve.

In operation a quantity of confetti or other matter is placed in the manifold 43, the motor 58 is then started which in turn drives the blower 47. The blower forces air through the manifold and into the space between the glass panel 17 and the frame 20 carrying the confetti with it. The column of air from the manifold retains the confetti in a state of agitated suspension at all times as shown in Fig. 1. When the flute valves are opened as previously described, the air flows through the indicia slots 34 and 35 into the chambers 31 and 32 and thence out through the apertures 38 and 39. As the air flows through the slots 34 and 35 the confetti follows the airstream but impinges on the screen 37 where it remains in the form of the indicia slots as shown in Fig. 3. When the flute valves close the air ceases to flow through the indicia slots whereupon the confetti falls from the screen and is again retained in a state of agitated suspension by the air from the manifold 43.

By recessing the nibs 36 a flow of air is provided over the entire area of the indicia slots so that there will be no blank spaces where the confetti will not adhere to the screen.

From the foregoing description it will be apparent that I have provided an improved animated display device which is simple in construction and highly efficient in use.

Having thus described my invention I claim:

1. In a display device, a housing including a bottom, front, side and top walls, said front wall having an aperture therein, a transparent closure member for said aperture, a frame member in said housing extending from side to side and spaced from said front wall forming a front chamber, said frame member having a front and a rear wall and having a plurality of chambers therein, said frame front wall having a plurality of stencil-like slots therethrough opening into said frame chambers, an air pervious material on the outer face of said frame front wall extending over said slots therein, said frame rear wall having apertures therethrough opening into said frame chambers, valve means for controlling passage through each of said frame rear wall apertures, an air manifold in said housing, said manifold including a horizontal section and a vertical section, said vertical section including an outlet portion opening into said front chamber, said horizontal section including an inlet portion, an air impeller in said housing, said impeller including an outlet portion and an inlet portion, said impeller outlet communicating with said manifold inlet, a plurality of stationary air deflector vanes and a plurality of adjustable air deflector vanes in said manifold intermediate said manifold inlet and outlet portions, said impeller inlet portion including an air inlet port and an adjustable valve member for controlling the passage of air through said inlet port.

2. In a display device, a housing including a chamber and having a transparent front portion, a partition member in said housing, said partition member including front and rear walls and having means therein forming a plurality of compartments, said partition member front wall having a plurality of stencil-like slots therethrough opening into said compartments and said chamber, air pervious material extending over the slots in said front wall, said rear wall having a valve opening into each compartment, a valve closure for each of said openings, means to alternately move said valve closures to open position, a blower having an outlet, a manifold having an elongated portion in communication with the blower outlet, a plurality of air deflectors in said elongated portion and angularly arranged with relation to each other and disposed in the path of air from the blower outlet to distribute air from the blower outlet along the manifold and an air deflector vane in said elongated portion adjacent each end thereof, said manifold having a second portion communicating with the horizontal portion and with the chamber.

3. In a display device, a housing including walls forming a chamber, said housing having a transparent front portion, a partition member in said housing, said partition member including front and rear walls and having means therein forming a plurality of compartments, one of said walls having a plurality of stencil-like slots therethrough opening into said compartments and said chamber, air pervious material extending over said slots, said rear wall having a valve opening into each compartment, a valve closure for each of said openings, means to move said valve closures to open position, a motor, means driven by said motor to operate said closure moving means alternately, a blower having an outlet, a manifold having a horizontal elongated portion in communication with the blower outlet, a plurality of air deflectors in said horizontal portion and angularly arranged with relation to each other and disposed in the path of air from the blower outlet to distribute air from the blower outlet along the manifold, an adjustable air deflector vane in said horizontal portion adjacent each end thereof, said manifold having a vertical portion communicating with the horizontal portion and with the chamber, and an adjustable air deflector in the vertical portion of the manifold at each end thereof.

4. In a display device, a housing including a chamber and having a transparent front portion, a partition member in said housing, said partition member including front and rear walls and having means therein forming a plurality of compartments, said partition member front wall having a plurality of stencil-like slots therethrough opening into said compartments and said chamber, air pervious material extending over the slots in said front wall, said rear wall having a valve opening into each compartment, a valve closure for each of said openings, means to move said valve closures to open position, a motor, a disk driven by said motor, means on said disk to operate said closure moving means alternately, a blower having an outlet and driven by said motor, a manifold having a horizontal elongated portion in communication with the blower outlet, a plurality of air deflectors in said horizontal portion and angularly arranged with relation to each other and disposed in the path of air from the blower outlet to distribute air from the blower outlet along the manifold, an adjustable air deflector vane in said horizontal portion adjacent each end thereof, said manifold having a vertical portion communicating with the horizontal portion and with the chamber, an adjustable air deflector in the vertical portion of the manifold at each end thereof, said blower having an inlet and means to hold said blower inlet closure in adjusted position.

ESTEY M. TURNER.